(12) United States Patent
Hermann et al.

(10) Patent No.: US 6,780,292 B2
(45) Date of Patent: Aug. 24, 2004

(54) ELECTROLYTIC TREATMENT APPARATUS HAVING REPLACEABLE AND INTERCHANGEABLE ELECTRODE REACTOR CARTRIDGES THEREFOR

(75) Inventors: Greg W. Hermann, LaGrande, OR (US); David L. Winburn, Milton Freewater, OR (US)

(73) Assignee: Raintech International, Inc., LaGrande, OR (US)

( * ) Notice: Subject to any disclaimer, the term of this patent is extended or adjusted under 35 U.S.C. 154(b) by 117 days.

(21) Appl. No.: 10/120,597

(22) Filed: Apr. 10, 2002

(65) Prior Publication Data

US 2002/0148722 A1 Oct. 17, 2002

Related U.S. Application Data

(60) Provisional application No. 60/283,070, filed on Apr. 11, 2001.

(51) Int. Cl.⁷ .............................. C25B 9/00; B23H 3/03
(52) U.S. Cl. .................. 204/269; 204/278.5; 204/286.1
(58) Field of Search ................................ 204/271, 269, 204/272, 278.5, 286.1, 297.01

(56) References Cited

U.S. PATENT DOCUMENTS

| 820,118 A | 5/1906 | Hinkson ...................... 204/268 |
| 6,139,710 A | 10/2000 | Powell ........................ 204/673 |

FOREIGN PATENT DOCUMENTS

GB     2222602    * 3/1990

* cited by examiner

Primary Examiner—Patrick Ryan
Assistant Examiner—Thomas H. Parsons
(74) Attorney, Agent, or Firm—Olson and Olson

(57) ABSTRACT

An electrolytic treatment apparatus includes a substantially hollow tubular outer vessel housing closed at its bottom end and provided with a liquid inlet and liquid outlet adjacent its bottom and top ends. A self-contained reactor cartridge unit integrates the vessel cap, electrodes, electrode supports, any electrode wiring connections and any liquid dispersion members into a single removable unit for installation into and removal from the vessel housing so that, when maintenance is required, complete reactor cartridges may be exchanged in a matter of seconds, thereby virtually eliminating downtime of the treatment system for maintenance and other electrode replacement needs.

12 Claims, 6 Drawing Sheets

ELECTROLYTIC TREATMENT APPARATUS HAVING REPLACEABLE AND INTERCHANGEABLE ELECTRODE REACTOR CARTRIDGES THEREFOR

This application claims benefit under 35 U.S.C. 119(e) of the priority filing date of earlier filed U.S. Provisional application Ser. No. 60/283,070 filed Apr. 11, 2001.

BACKGROUND OF THE INVENTION

This invention relates to devices for the electrolytic treatment of liquids, and more particularly to an electrolytic treatment apparatus that is arranged to provide for very rapid changes of electrode assemblies that are provided as complete, self-contained reactor cartridges, whereby to virtually eliminate maintenance down time of the treatment apparatus for electrode replacement, cleaning and other operational requirements.

Numerous electrolytic devices have been developed over the years for the treatment of liquids. Many of these treatment devices make use of a plurality of electrodes that are placed within a housing and connected to a DC power source. As the liquid is passed between the electrodes, contaminants precipitate and become separable. A wide variety of electrode geometries and configurations have been developed, with the idea that one geometry or configuration may treat or function better with different liquids and contaminants than others, or would require less power to operate.

Providing and managing clean water is the greatest problem faced by municipalities, industry and nations. For decades, the industry has relied primarily on chemicals to treat a number of aqueous solutions, including water for drinking, raw sewage, and industrial process fluids. However, increasingly high levels of pollution and the rapid decline of clean water sources is requiring industries of all types to seek better, more cost effective ways to improve treatment and remove a much higher percentage of contaminants. Chemicals are not only expensive, but they significantly reduce the amount of water that can be reclaimed and increase the amount of sludge that must be disposed. Chemicals also limit the percentage of contaminants than can be removed, making it difficult to meet present and future treatment requirements and near impossible to provide water suitable for reuse. Chemicals used for killing microorganisms within drinking water have also been shown as a health risk and is becoming less acceptable. Although several other methods have been developed and are presently being used for treating liquids, such as distillation, reverse osmosis, and ion exchange, these technologies either cost too much to operate, will not treat larger volumes of liquid, will not treat liquids containing high concentrations of suspended solids, or significantly reduce the amount of clean liquid that can be reclaimed.

Recent efforts to find better, more cost effective solutions for improving treatment requirements have raised considerable interest in other technologies that do not involve the use of chemicals. Industries and governments have begun looking into electrolytic treatment, which has been a long ignored but proven method for electrochemically precipitating and removing impurities from liquid. This type of electrolytic treatment typically involves a reaction housing that contains two or more electrodes spaced closely to each other and connected to a source of power, preferably Direct Current (DC). The liquid becomes treated as it is introduced between the electrodes and is subjected to an electrical field, causing impurities to precipitate to form a flocculent that is separable from the liquid using a number of mechanical and non mechanical methods, including filters, plate clarifiers, sedimentation, centrifugal separators, and floatation devices with skimmers.

In addition, the electrical field causes microorganisms to be killed, and other impurities of cellular nature to rupture, releasing liquid contained within them and further reducing the amount of produced sludge that must be handled or disposed. Also during the treatment process, hydrogen and oxygen gasses become present, furthering treatment by oxidizing the impurities. Electrolytic treatment offers a significant advantage over chemicals and many other methods of treating liquid, as it provides a much wider spectrum of treatment by precipitating and oxidizing impurities, destroying organisms, and dewatering sludge, all within a single pass between two or more electrodes that are connected to a source of power.

Numerous electrolytic devices have been developed through the years for the treatment of liquids using a number of different electrodes and configurations in an effort to provide improved performance. Among these improvements include distributing liquid more evenly between the electrodes, reducing electrical power consumption, preventing gasses and solids from being trapped in the housing, reducing the size and cost, reducing electrode wear and replacement time, or providing a method for treating larger liquid volumes.

Despite the many intended improvements, electrolytic devices have remained practically unheard of and rarely used in the industry. The reason for this is previous devices do not provide a quick and practical method for inserting and removing electrodes within the reaction housing for maintenance. Practical methods for providing maintenance is essential, as electrodes will often become coated with contaminants and/or dissolve in the water, requiring them to be removed from the housing either for cleaning or replacement. Different methods have been employed in the past to help solve many problems related to electrodes dissolving and collecting scalings or coatings, including reversing the polarity of the electrodes or shorting them to ground. These techniques will help extend the operational life expectancy of the electrodes; however, this can never fully replace having to perform maintenance on them.

Some commercial applications will cause the electrodes to coat within less than one hour, even with the use of polarity reversing. Methods for automatically cleaning electrodes while they remain in the housing also have been implemented into some devices using a combination of pumps, valving, and storage tanks for holding acidic cleaning solutions. This method has proven to work well; however, it requires additional space and is too expensive to incorporate into smaller devices. Despite the various attempts to reduce maintenance, a certain degree of manual maintenance is unavoidable and a practical method for providing maintenance is essential.

The problem with devices of the prior art is they employ cumbersome designs that make maintenance difficult, time consuming, and often labor-intensive. Several steps must be taken with previous devices in order to remove any coverings, support structures, and/or electrical connections before electrodes can be removed from the reaction housing for maintenance. The same amount of time taken to remove electrodes from previous devices is required to reinstall them back in the housing, which soon adds up to costly labor expenses, not to mention the necessary downtime while maintenance was being performed. In addition, previous devices consist of a specific reaction housing designed to function with a particular geometry of electrode. This prevents them from using other types of electrodes within the same housing that may be more readily available, cost less, or might work better with certain liquids. Additionally, these devices require the operator to source their own electrode material and fabricate them for replacement, instead of being able to simply purchase a cartridge containing the electrodes that could be installed in one easy step into the housing.

The frequency of electrode replacement due to dissolving in the liquid will depend on the size and quantity of the electrodes, duration of operation, and composition of the liquid being treated. Electrode replacement could be required within hours to weeks depending on the application. Some liquids contain contaminants that can coat the electrodes within minutes, preventing proper DC current transfer between them and requiring the electrodes to be frequently removed and cleaned. Although acid can be introduced directly into the housing of some devices to clean the electrodes, certain applications may not permit this, especially if the device is being used to treat drinking water.

Aside from electrodes dissolving or being coated with contaminants, the composition of liquids to be treated may change, requiring electrodes to be removed from the device and be replaced with different ones, such as electrodes made from stainless steel or electrodes made from aluminum as different metals may achieve better treatment results. These factors place prior art devices at a critical disadvantage, as they typically employ cumbersome construction that make electrode replacement difficult, time-consuming, and often labor-intensive.

Devices of the prior art all require several steps to be taken before the electrodes can be placed in or removed from the housing. As an example, U.S. Pat. No. 820,113 uses a plurality of cylindrical electrodes placed vertically within a closed housing. However, the fasteners, electrodes, cover, and electrical connections are all individual components, requiring each of them to be removed separately from the housing. The same amount of time taken to remove the electrodes is required to reassemble them back in the housing, resulting in costly labor expenses, as well as all the down time while maintenance was being performed.

U.S. Pat. No. 6,139,710, uses a plurality of vertical electrode plates within a treatment housing. The electrodes are placed within the housing separate from electrical connections and the cover, requiring additional steps be performed for the electrodes to be replaced. This device makes use of a plurality of non-conductive rods for spacing the electrodes and interconnecting them so they may be removed together from the housing. While this allows removal of the electrodes as a unit, the cover and all electrical connections must first be disassembled individually. Further, the installation process requires each electrode to be placed within the housing one at a time, requiring an extensive amount of time and labor, along with a degree of difficulty as the number and size of the electrodes are increased to treat larger volumes of liquid. Then wiring is required, followed by installation of the cover. The obvious shortcoming of electrolytic treatment devices that make use of a plurality of electrodes is that they do not allow all of the electrodes, cover, and electrical wiring to be removed from and installed into the housing as a single, replaceable component.

SUMMARY OF THE INVENTION

In its basic concept this invention provides an electrolytic treatment apparatus in which a plurality of electrodes, any wiring connections thereto, electrode supports, and any liquid dispersion structures are integrated together into a self-contained, self-supporting reactor cartridge unit arranged for rapid installation into and removal from a corresponding reaction vessel as self-contained, exchangeable and interchangeable units.

It is by virtue of the foregoing basic concept that the principal objective of this invention is achieved; namely, the provision of an electrolytic treatment apparatus that overcomes the limitations and disadvantages of electrolytic treatment devices of the prior art.

Another object of this invention is the provision of an electrolytic treatment apparatus of the class described which, by providing exchangeable reactor cartridges, substantially eliminates downtime of electrolytic treatment systems due to electrode wear, failure and need for cleaning.

Another object of this invention is the provision of an electrolytic treatment apparatus of the class described which completely eliminates the heretofore necessary custom, in-house fabrication of electrodes and electrode support and wiring connections required in prior art electrolytic treatment systems.

Still another object of this invention is the provision of an electrolytic treatment apparatus of the class described in which different reactor cartridges may be provided with electrodes of different material and/or configuration whereby reactor cartridges may be selected and exchanged as desired or needed in order to treat different liquids and/or contaminants as may be needed.

A further object of this invention is the provision of an electrolytic treatment apparatus of the class described which is of simplified construction for economical manufacture.

The foregoing and other objects and advantages of the present invention will appear from the following detailed description, taken in connection with the accompanying drawings of preferred embodiments.

DESCRIPTION OF THE PREFERRED EMBODIMENTS

Figure 1:
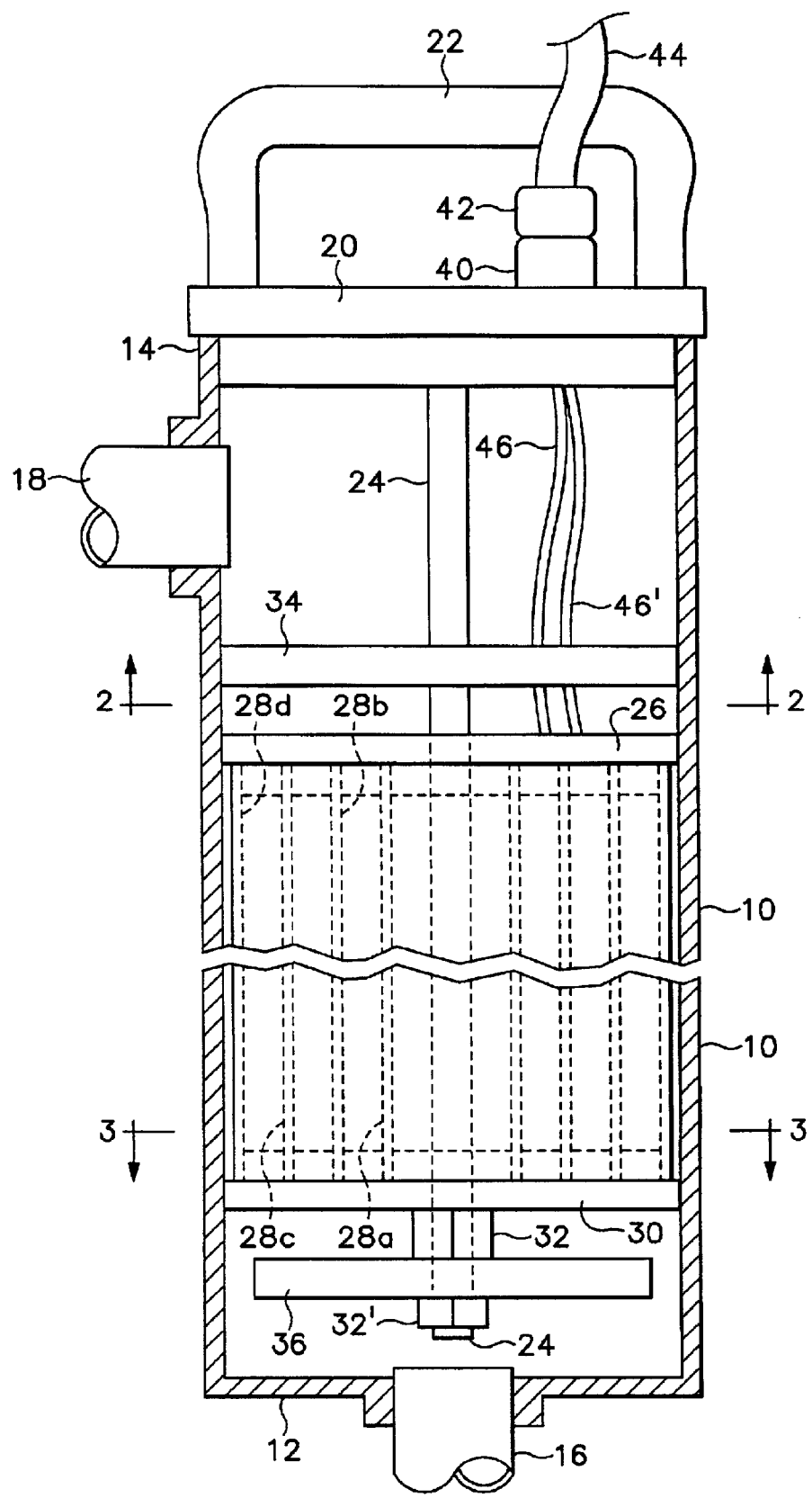
FIG. 1 is a foreshortened side elevation of a treatment apparatus embodying features of this invention, the reaction vessel housing shown in section to expose a cylindrical electrode-supporting reactor cartridge mounted therein.
Figure 2:
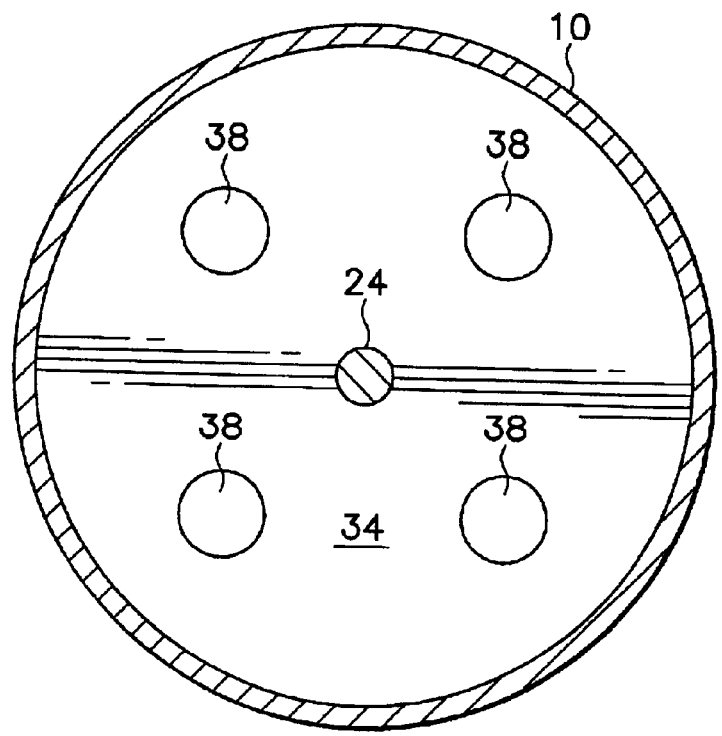
FIG. 2 is a sectional view through the apparatus of FIG. 1 showing the underside of the upper liquid dispersion plate of the cartridge, taken along the line 2—2 in FIG. 1.
Figure 3:
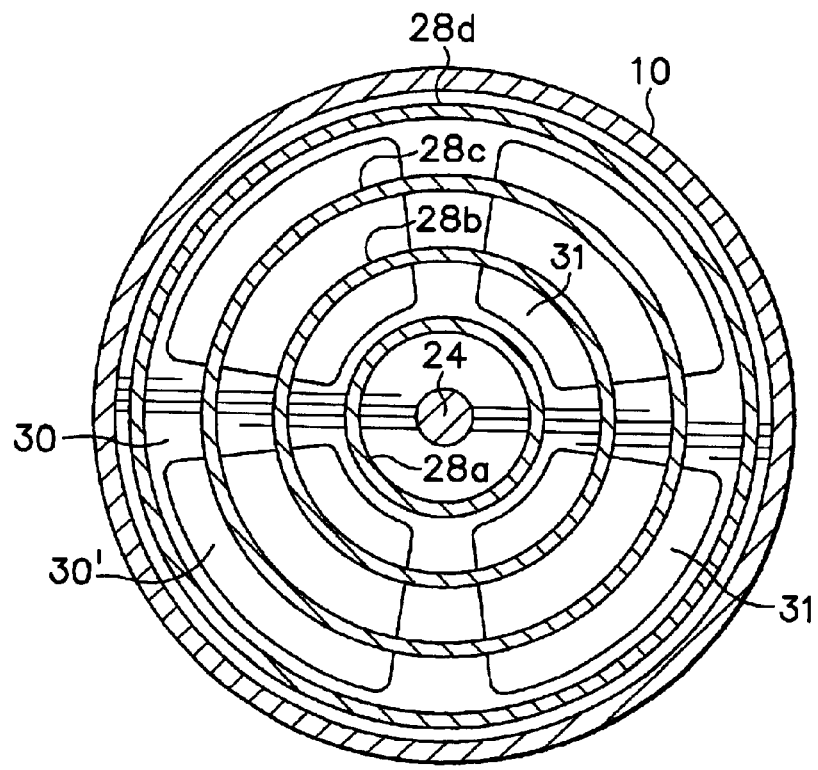
FIG. 3 is a sectional view through the vessel and reactor cartridge taken along the line 3—3 in FIG. 1.
Figure 4:
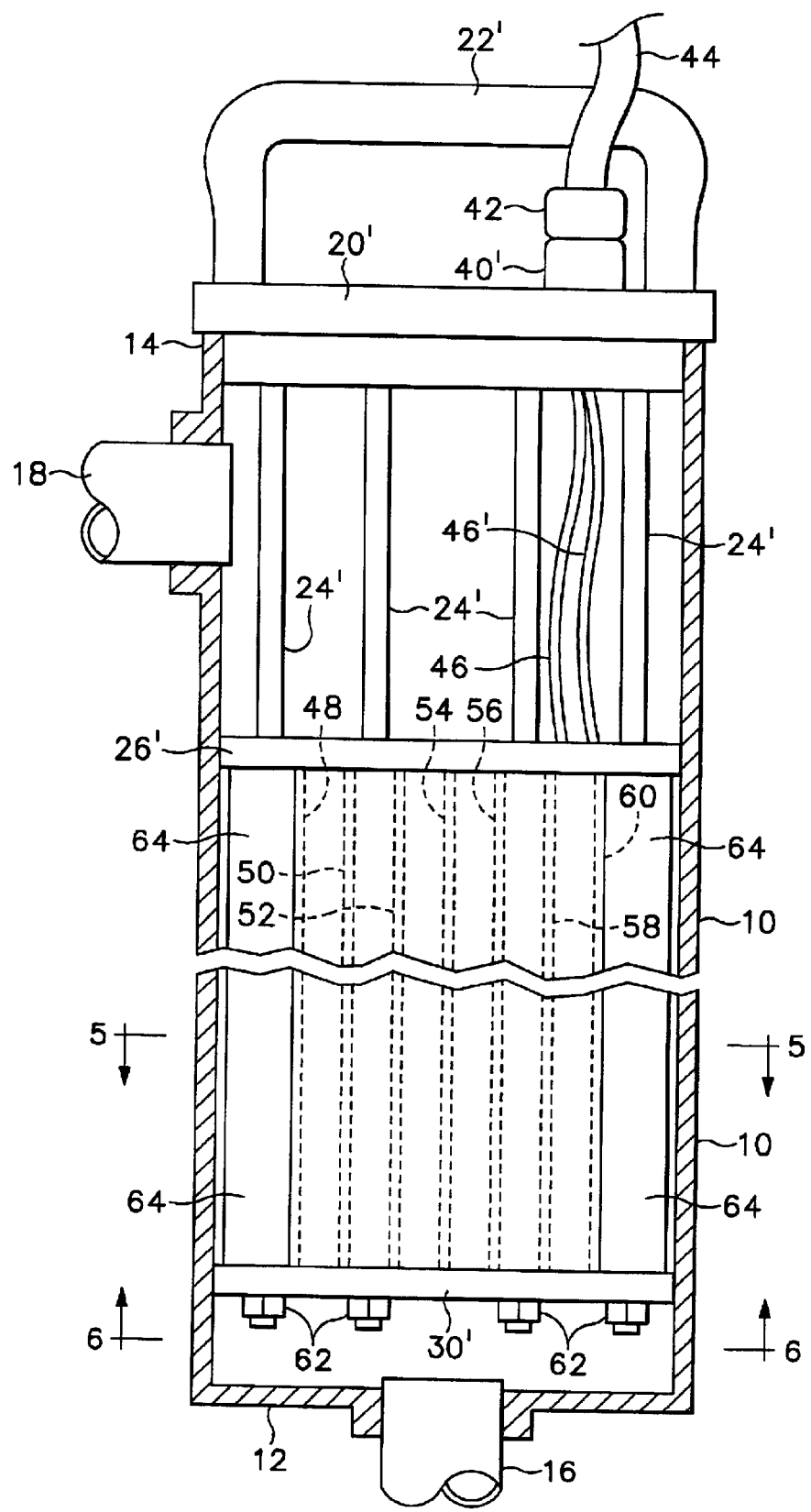
FIG. 4 is a foreshortened side elevation of the cyclindrical reaction vessel housing of FIG. 1 mounting a flat plate electrode-supporting reactor cartridge therein.

FIGS. 1 and 4 illustrate a treatment apparatus embodying features of this invention which will now be described in connection with a first embodiment shown in FIGS. 1–6. The treatment apparatus includes a hollow reaction vessel 10 preferably, although not necessarily, provided in the form of a simple tubular cylinder having a closed bottom end 12 and an open top end 14 configured for releasable reception of a vessel-sealing cap member to be described later.

In the embodiment illustrated, the bottom of the vessel housing 10 is provided with a liquid inlet 16 configured for attachment to a source of supply of a liquid to be treated, and a liquid outlet 18 is provided in the upper portion of the vessel housing for passage of treated liquid out of the vessel. As will be understood by those skilled in the art, liquid is typically pumped through the vessel in order to select and control the desired flow rate of the liquid through the vessel as needed to give optimal treatment of the liquid. Further, in the treatment apparatus of the present invention it is preferable, although not necessarily required, that a pump is associated with the outlet end of the vessel in order to draw liquid through the apparatus rather than push liquid through from the inlet end of the vessel. This method is preferred because it tends to provide for a more even distribution of liquid consistently passing through the vessel.

The treatment apparatus of this invention also includes a reactor cartridge assembly that in this embodiment integrates a vessel housing sealing cap member; a plurality of cylindrical electrode members; all necessary internal electrode support structures and wiring connections, as well as liquid dispersion members into a single, self-contained unit that is configured to provide substantially immediate removal from and installation into the vessel housing for substantially immediate exchanges with other reactor cartridges when maintenance or replacement of electrodes is needed. In this regard, a reactor cartridge base support member provides means for mounting all of the reactor cartridge components into a single unit and also provides means for supporting the reactor cartridge as a unit operatively within the vessel housing.

In the preferred form of the invention the reactor cartridge base support means is configured herein as a vessel cap member 20 which also provides means for releasably engaging, closing and sealing the open top end of the vessel. This sealing engagement may be provided in any suitable, conventional manner, such as by threaded screw cap-type connection, twist-lock interconnection or other connection arrangement in which the cap member releasably engages the vessel housing to close the open end of the vessel. As will be understood, the vessel cap therefore is configured to support the entire weight of the reactor cartridge. In the embodiment illustrated, the cap member 20 includes a handle member 22 arranged to facilitate attachment and removal of the cap from the vessel and for lifting and carrying the reactor cartridge as will become clear.

The cap member includes means for mounting and supporting a plurality of electrode members therefrom, provided in this embodiment of a reactor cartridge as a longitudinally elongated electrode support rod member 24 fixedly secured to the cap member 20 for extension from the center of the underside of the cap member to a point terminating above the bottom wall 12 of the vessel when the cap is installed on the vessel as seen in FIG. 1. This support rod member 24 fixedly mounts an upper electrode support bracket 26 formed of electrically non-conductive material and configured to seat the top edges of a plurality of cylindrical electrode members 28a–d in the spaced apart, nested condition seen in FIGS. 1 and 3. A substantially identical bottom electrode support bracket 30 is slidably carried on the support rod member 24 to seat and support the bottom edge of the electrodes. As is evident, the terminal end of the support rod 24 in this case is threaded in order to receive a nut 32 whereby to threadably move the bottom support bracket 30 toward the upper bracket 26 to effectively clamp the electrodes securely therebetween in properly spaced, stacked condition as shown in FIGS. 1 and 3. Each electrode support bracket member 26, 30 is configured to provide a substantially sealing engagement with the inner wall of the vessel housing whereby to prevent liquid flow between the outer surface of the outer electrode 28d and the inner wall surface of the vessel housing. Also, the electrode brackets are further arranged to prevent liquid flow through the inner confines of the centermost cylindrical electrode 28a. As will be understood by those skilled in the art, since no electrolytic action can occur in the innermost section and the outermost section, liquid must be prevented from passing therethrough else it will pass through completely untreated.

Preferably, as shown, the reactor cartridge also includes liquid dispersing means for assuring even distribution of liquid through the space between adjacent electrodes and for controlling the flow rate of the liquid through the electrode assemblies. The structures for the dispersion means may vary in geometry, positioning and composition depending on the particular electrode configuration and characteristics of the liquid being treated. In the present embodiment this liquid dispersion means is provided by upper and lower dispersion plates 34, 36 respectively, secured in any suitable manner, such as by clamp nut 32' shown securing plate 36 to the support rod 24, at predetermined points above and below respective electrode support brackets 26, 34. The bottom dispersion plate is configured to deflect and direct liquid entering the vessel 10 through inlet 16 outwardly for even flow therearound and thence through openings 31 through the lower and upper electrode brackets 30, 26 and between the adjacent electrodes supported thereby. The upper dispersion plate 34 (FIGS. 1 and 2) is configured, as shown, with openings 38 therethrough which limit flow in order to assure even distribution of the liquid between the electrodes therebeneath. Preferably the upper dispersion plate is also configured for substantially sealing engagement with the inner wall of the vessel housing so as to restrict flow to only the bores 38 through the plate. Therefore, it can be seen that the two dispersion plates 34, 36 work together as liquid enters the reactor vessel through the bottom inlet opening and around the outside of the lower plate 30. The liquid then flows upward evenly between the spaced apart electrodes and through the openings 38 through the upper dispersion plate 34. The difference in flow pattern between the first and second dispersion plates causes the liquid to disperse evenly between the electrodes.

As illustrated, the reactor cartridge base support means (vessel cap member 20 in this embodiment) also provides means for the electrical connection of the electrodes with a source of power outside the reactor vessel housing. As shown the cap member 20 mounts an electrical connector 40 for connection to a DC power source. In this embodiment connector 40 is configured to receive a corresponding plug member 42 of a power cord 44. Electrical wiring 46, 46' (or conductive metallic rods, not shown) extend from the electrical connector 40 to selected electrodes within the housing. Any number of electrodes can be connected to the power source to either increase or decrease power within the reactor, and various power arrangements can be accommodated as well. For example, the inner electrode 28a may be connected to a positive lead while the outermost electrode 28d is connected to negative, leaving intermediate electrodes unpowered if desired, or respective electrodes may be alternately positively and negatively charged if desired, all of which is well understood by those skilled in the art.

As will also be understood, substantially identical reactor cartridges may be provided with different such electrical connection arrangements, thus allowing the operator to simply select a desired reactor cartridge having the desired electrical arrangement for a particular treatment application. Similarly, as will also be understood by those skilled in the art, the reactor cartridge of this invention may be configured to support more or less electrodes than the four cylindrical electrodes shown herein, and also, different reactor cartridges can be provided having electrodes formed of various different, desired materials. For example, one reactor cartridge may be provided with aluminum electrodes and another reactor cartridge provided with steel electrodes, so that the operator may select and install a reactor cartridge chosen for optimal performance with various different liquids and contaminants to be treated.

FIG. 4 further highlights the unique features of the reactor cartridge arrangement of this invention by showing that the same vessel housing 10 may just as easily and quickly receive reactor cartridges utilizing different, alternative electrode configurations such as the flat plate electrode configuration illustrated. In this regard, vessel cap member 20' fixedly mounts a plurality of depending support rod members 24' configured to receive and mount upper and lower electrode support brackets 26', 30' for clamping support therebetween of a plurality of flat plate electrodes 48–60, as by support rod clamp nuts 62. As discussed previously in connection with electrode support brackets 26, 30, electrode support brackets 26', 30' are also configured for sealing engagement with the inner cylindrical wall of the vessel housing 10 to prevent the passage of liquid therebetween.

Figure 5:
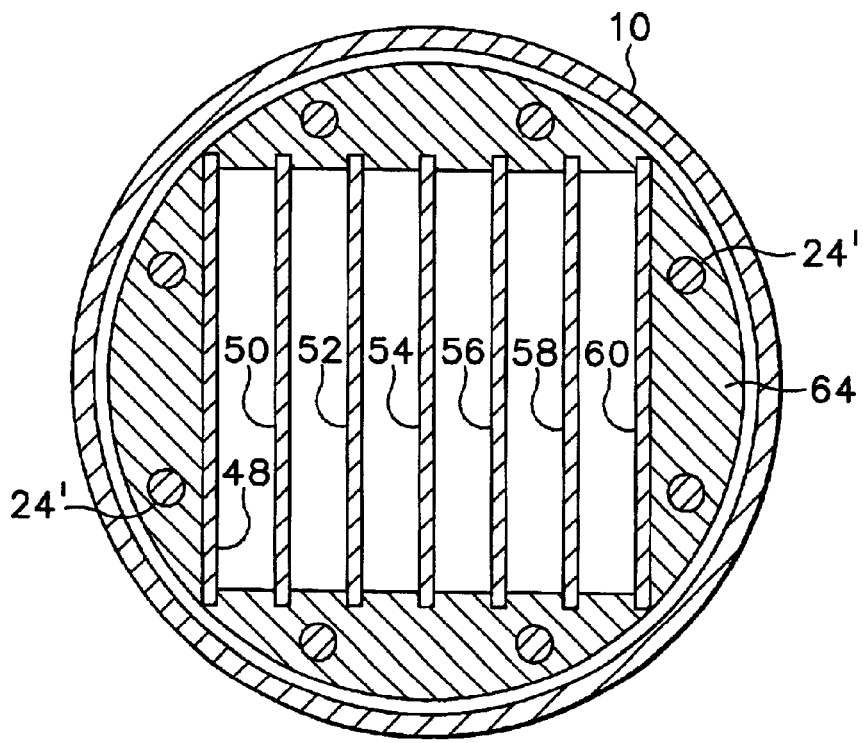
FIG. 5 is a sectional view through the vessel and reactor cartridge of FIG. 4 taken along the line 5—5 in FIG. 4.
Figure 6:
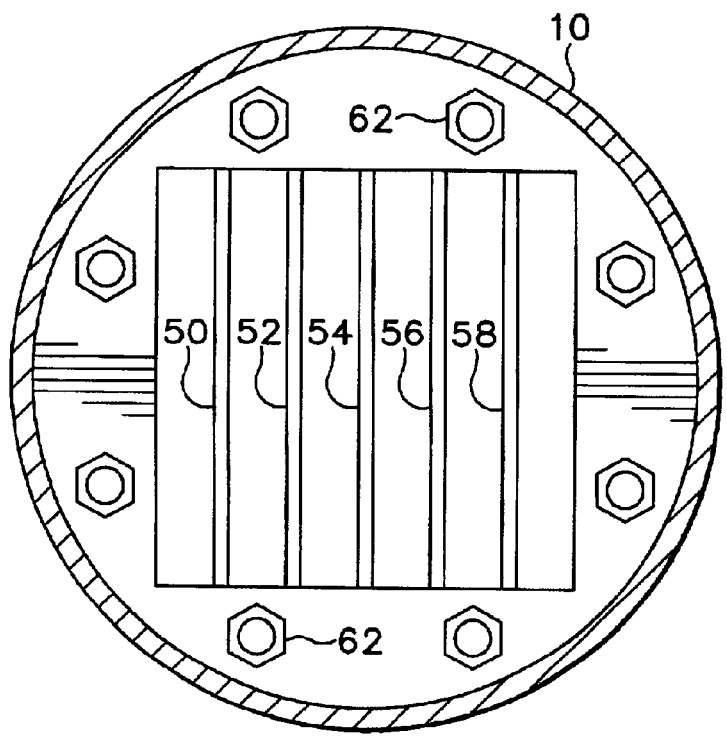
FIG. 6 is a sectional view through the apparatus of FIG. 4 showing the underside of the reactor cartridge supported therein, taken along the line 6—6 in FIG. 4.

Further, as readily apparent in viewing FIGS. 5 and 6 of the drawings, since the longitudinal ends of the flat plate electrodes prevent an open passage to the inner wall of the cylindrical housing vessel, the space between the electrode members and the inner wall of the vessel housing between the opposite, upper and lower electrode support brackets 26', 30' includes an encircling sleeve 64 of non-electrically conductive material configured to completely close the open space and restrict liquid flow to the vertically extending openings between adjacent electrodes 48–60, as readily apparent in FIGS. 5 and 6 of the drawings.

In this manner, the reactor cartridge is provided with an exterior configuration that operatively corresponds to the interior configuration of the vessel housing wall while also operatively supporting a plurality of flat plate electrodes together forming a substantially square cross sectional layout. Wires 46, 46' interconnect electrical connector 40' on the cap member 20' with the electrodes 48–60 in any desired power arrangement as previously discussed in connection with the reactor cartridge of FIG. 1. Dispersion means (not shown) may if desired be provided to this embodiment of reactor cartridge as previously discussed and described in connection with the dispersion members 34, 36 of the previous reactor cartridge embodiment.

From the foregoing the operation of the present invention should be readily apparent: Contaminated liquid to be treated is pumped through the vessel from bottom inlet to upper outlet passing evenly inbetween the electrified electrodes. Over the course of time, the electrodes may eventually become in need of cleaning or may have corroded over time and are in need of replacement, at which time the liquid pump (not shown) is turned off, the electrical source power cord 42, 44 is unplugged from electrical connector 40, 40' and the vessel cap member 20, 20' is released from its connection to the vessel as by unscrewing, untwisting or unlatching and the reactor cartridge is simply lifted out of the vessel housing 10. A replacement reactor cartridge is then selected and slid into the vessel housing 10, re-secured as by screwing, twisting or latching the cap member and plugging the power cord 42, 44 back into the electrical connector 40. The treatment apparatus is then ready to resume operation in the treatment of liquids. As will be appreciated, the total downtime of the treatment process is mere seconds and involves an absolute minimum of labor and expertise.

At this point the previous reactor cartridge may be cleaned as needed or be discarded or returned to a cartridge supplier as a rebuildable "core exchange". As will be apparent to the industry, the mass manufacture of standardized reactor cartridges, albeit provided in a number of various "models" having different electrode characteristics and/or wiring arrangements as discussed, can provide a far more economical reactor cartridge to the industry than the costs now involved for each treatment facility to have custom fabricated their own specialized electrodes along with the necessary disassembly and reassembly of reaction parts into the treatment vessels during extensive downtimes for the change out process. Moreover, the same expedient changeover process of this invention allows the same treatment apparatus to rapidly accommodate the treatment of different liquids and contaminants requiring different electrode characteristics for optimum performance by simple exchange of reactor cartridge.

Figure 7:
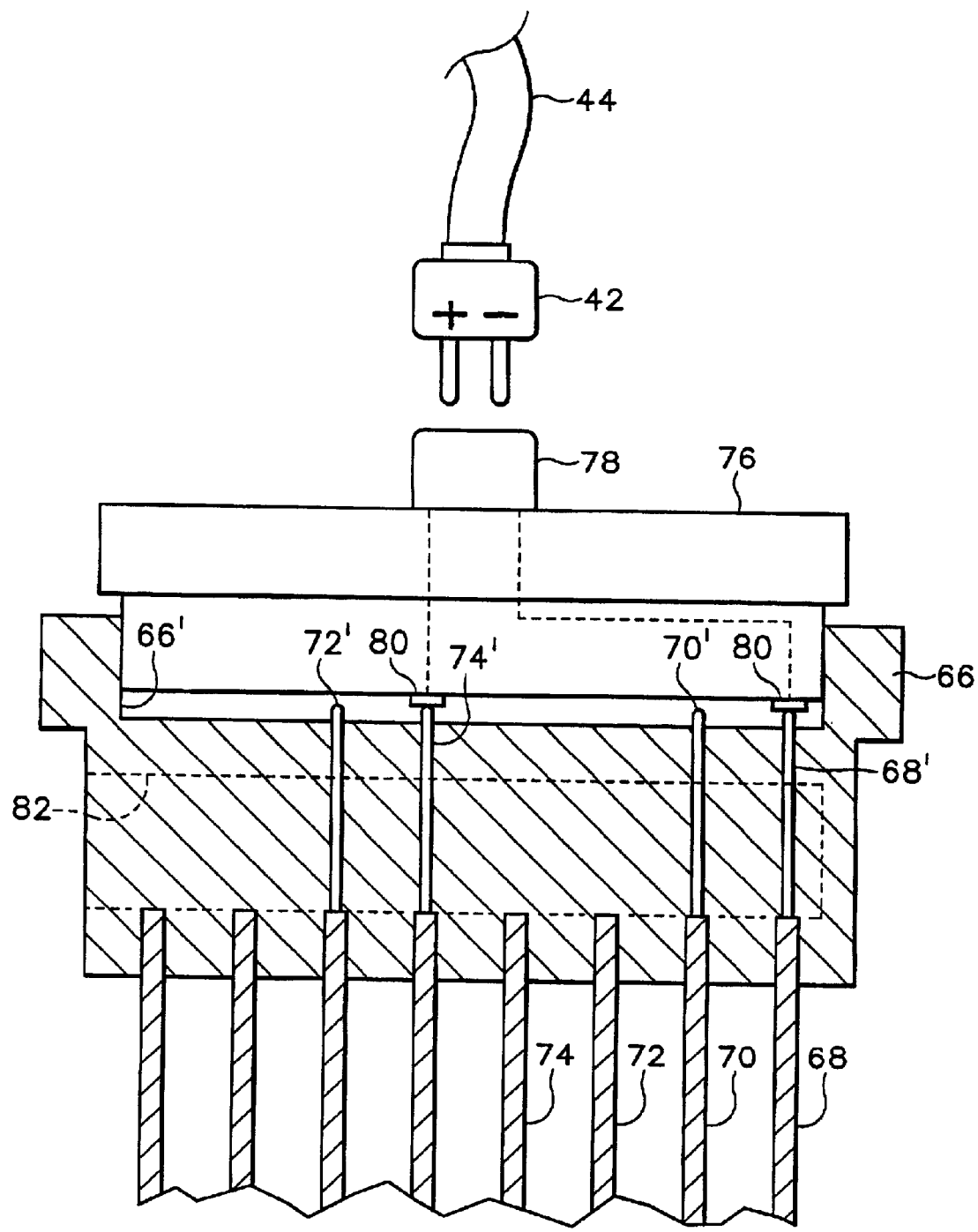
FIG. 7 is a fragmentary view of the upper end portion of another embodiment of an integral electrode-mounting reactor cartridge and vessel cap having an electrical junction arrangement for selectively powering the electrodes in predetermined patterns as desired for different treatment applications.

FIG. 7 shows the upper end of a reactor cartridge particularly well suited to smaller treatment applications where electrode weight isn't such a great factor. In this embodiment, a vessel cap member 66 is configured to directly mount a plurality of electrodes, in this particular embodiment four cylindrical electrodes 68–74, in direct engagement. This engagement may be a press fit connection of the electrodes within preformed slots molded in the base of the cap member, or the electrodes may be molded into the cap member during manufacture of the cap member itself. Each electrode includes a projecting post portion 68'–74' that extends through the body of the cap member as shown to a point exposed within a seating recess 66' in the top of the cap member. As will be understood from the discussion of the cap member of the foregoing embodiments, the cap member 66 is provided for releasable connection to and support on a vessel housing such has been described hereinbefore.

In this particular embodiment a separate electrical junction block member 76 also preferably formed of non-electrically conductive material is configured to be releasably engageable with the cap member 66 as shown. This junction block member 76 includes an electric connector member 78 configured to releasably receive the plug 42 of a DC power cord 44, the electrical connector 78 being connected to exposed electrical terminals 80 on the junction block member configured and positioned for contact with the projecting ends of pre-selected post members 68'–74' when the junction block member is inserted into the corresponding seating recess 66' formed in the top of the cap member 66. In this embodiment, terminals 80 are provided to engage the post members 68', 74' to electrify the innermost and outermost electrodes. A different junction block member 76, (or a modified member) may include terminals 80 (not shown) arranged to engage the other electrode posts 70', 72' so that all electrodes are connected to power if desired.

As will also be apparent, during the molding of the electrical junction block 76, different wiring arrangements between connector 78 and other terminals (not shown) may be provided whereby different electrode electrification arrangements can be provided by selecting different junction block members 76 having desired, different wiring arrangements as indicated here in broken lines. Further, the cap member 66 may if desired be provided with a liquid outlet channel 82 whereby liquid may exit a vessel. From the foregoing it will be apparent that the reactor cartridge of this embodiment provides an extremely economical-to manufacture unit comprising a plurality of electrodes 68–72 integrally molded with a cap member 66 which results in a "throw away" cartridge element that can be replaced, even in the smallest treatment systems, extremely economically. Further, this arrangement completely isolates the electrical connection to the electrodes from any contact with the liquid being treated, and therefore from any damage from such contact.

Figure 8:
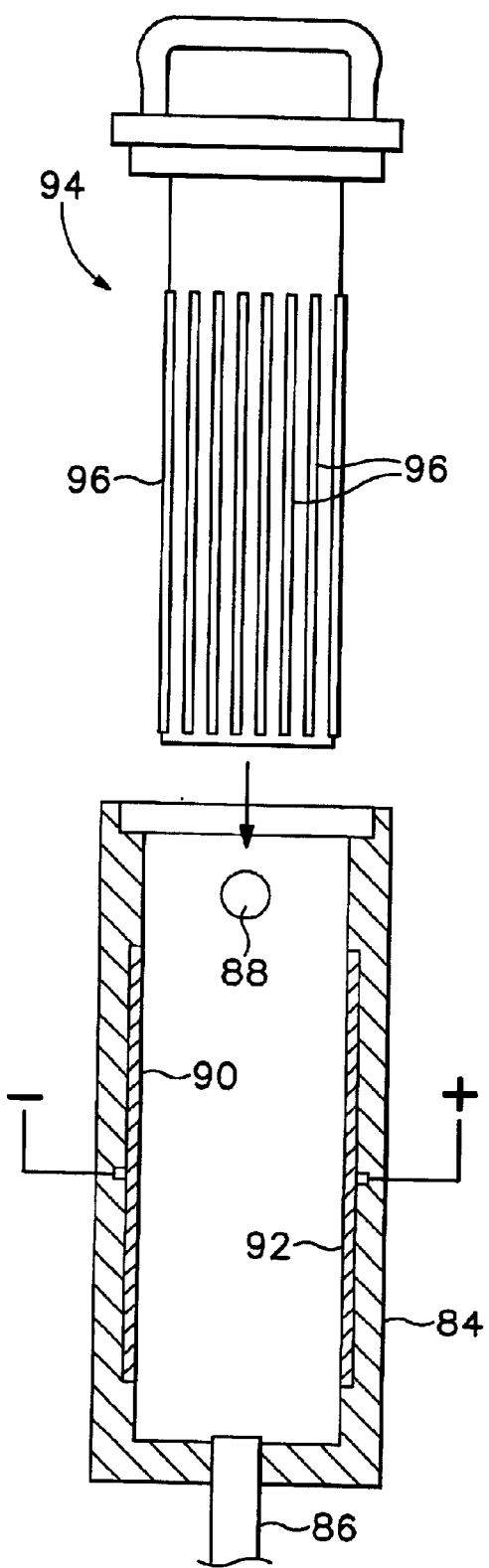
FIG. 8 is an exploded view of another embodiment of a treatment apparatus in which power is supplied to non-sacrificial electrodes mounted in the vessel housing and the removable reactor cartridge mounts a plurality of non-powered, sacrificial flat plate electrodes.
Figure 9:
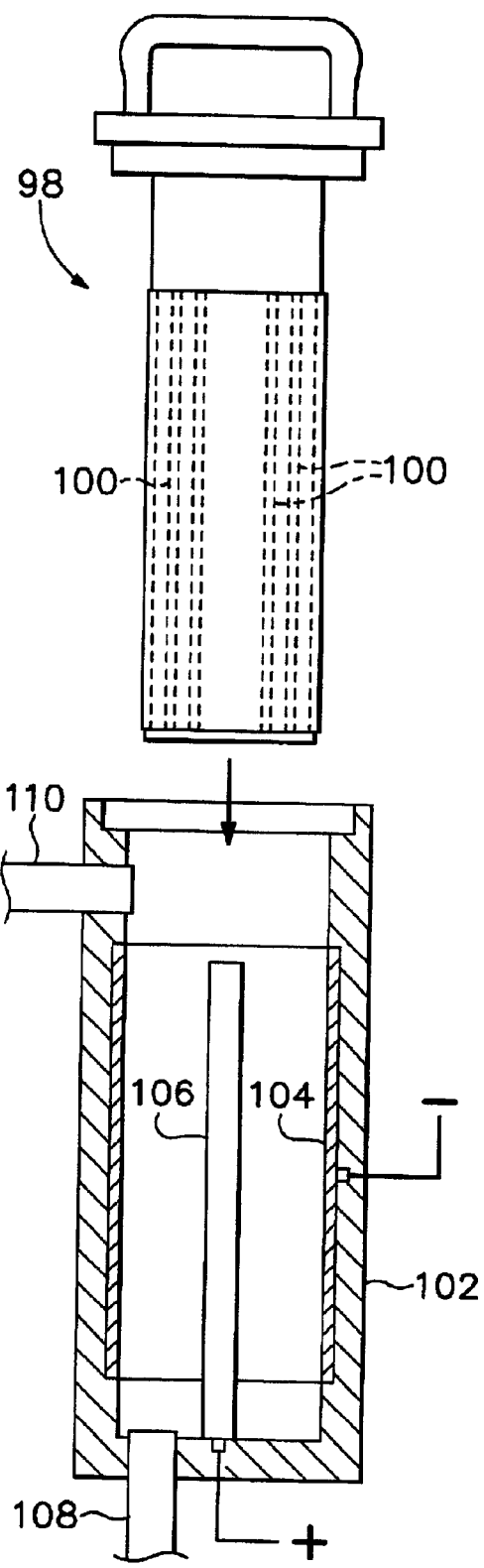
FIG. 9 is an exploded view of yet another embodiment of a treatment system generally similar to that of FIG. 8 but provided with a non-sacrificial center rod electrode and an outer cylinder electrode in the vessel, the reactor cartridge mounting a plurality of nested, non-powered sacrificial cylindrical electrodes.

Finally, FIGS. 8 and 9 schematically illustrate additional embodiments of this invention wherein, in FIG. 8, a vessel housing 84 is provided with a liquid inlet 86 and a liquid outlet 88 and mounts on its opposite side walls non-sacrificial electrodes which are connected to a source of power as indicated. A reactor cartridge member 94 is arranged to support a plurality of non-electrified, sacrificial flat plates 96 for disposition between the powered, non-sacrificial electrodes 90, 92 mounted in the vessel housing. In this manner, when the sacrificial electrodes become worn due to dissolving in the liquids during treatment, the reactor cartridge 94 is simply removed and replaced with a fresh reactor cartridge.

FIG. 9 schematically illustrates another treatment system, similar to the embodiment of FIG. 8, but configured for operation with a reactor cartridge 98 mounting a plurality of cylindrical electrodes 100. In this case the vessel housing 102 mounts a cylindrical outer non-sacrificial electrode 104 and an inner, non-sacrificial rod electrode 106. As will be understood liquid passes into the vessel housing through inlet 108 and through reactor cartridge and out the liquid outlet 110 disposed at the top of the vessel housing. The embodiments of FIGS. 8 and 9 are particularly well suited to smaller treatment applications involving materials that require frequent electrode changes and typically minimal power requirements.

From the foregoing it will be apparent that the treatment apparatus of this invention may be scaled to any size so as to provide a treatment device for personal carry, residential use or having commercial and industrial use. The size of the treatment device will generally be scaled according to the volume of liquid that needs to be treated, although multiple treatment assemblies as described hereinbefore can be connected to a common source of supply to increase overall volume of liquid being treated. Additionally, it may be desirable that the output of one treatment assembly may be directed to the inlet end of a second treatment assembly whereby to enhance treatment or potentially to provide multiple treatments of the same liquid for different particular contaminants. As will also be apparent to those skilled in the art the output of the treatment apparatus of this invention may be directed to other filtering devices arranged to provide additional treatment of the liquid as needed or desired.

From the foregoing it will be apparent to those skilled in the art that various changes other than those already discussed may be made in the size, shape, type, number and arrangement of parts described hereinbefore without departing from the spirit of this invention and the scope of the appended claims.

Having thus described our invention and the manner in which it is used, we claim:

1. A treatment apparatus for the electrolytic treatment of liquids, the treatment apparatus comprising:
   a) a substantially hollow vessel housing member having a first closed end and an opposite, releasably closeable, open second end defining a predetermined, substantially uniform liquid containing vessel interior space therebetween,
   b) at least one electrode-mounting reactor cartridge member configured for installation into and removal from said substantially hollow vessel interior space as a single unit through said releasably closeable, open second end, each said at least one reactor cartridge member comprising:
      (1) a cartridge base support member configured to releasably engage said vessel housing for supporting the cartridge member within the substantially hollow interior of the vessel housing, said cartridge base support member being configured as a vessel cap member arranged to engage said vessel housing member to releasably close said second, open end thereof for disposition of electrodes of said reactor cartridge operatively within the interior of the vessel housing member,
      (2) a plurality of electrodes formed of a selected material and having a selected, relatively correspondingly configuration, and
      (3) electrode-securing support means on said base support member for securing and supporting said plurality of electrodes in operative, spaced apart condition entirely separately from and independently of any electrical connection of any of said plurality of electrodes to a source of electrical power,
      (4) whereby each said at least one reactor cartridge member may selectively and alternately be installed into and removed from said vessel housing member as a single, self-contained unit, and
   c) electrical connector means on said reactor cartridge base support member for releasably connecting selected electrodes of the reactor cartridge to a source of electrical power outside the vessel housing.

2. The treatment apparatus of claim 1 wherein said electrical connector means is further arranged for selectively connecting selected electrodes to a source of power in different electrode combinations as desired for different liquid treatment requirements.

3. The treatment apparatus of claim 1 wherein said vessel housing member includes liquid inlet means and liquid outlet means for introducing a flow of liquid into said vessel housing member and through the interior of the vessel between the spaced apart plurality of electrodes of a reactor cartridge installed in the vessel and then out of the vessel housing in a continuous, regulated flow.

4. The treatment apparatus of claim 3 wherein said electrical connector means is further arranged for selectively connecting selected electrodes to a source of power in different electrode combinations as desired for different liquid treatment requirements.

5. The treatment apparatus of claim 3 wherein said vessel housing member fixedly mounts spaced apart first and second non sacrificial electrodes each connected to a source of power and said removable reactor cartridge member mounts a plurality of non electrified, sacrificial electrodes configured, when said reactor cartridge is installed in said vessel housing member, to conductively intercept the space between said first and second non sacrificial electrodes.

6. The treatment apparatus of claim 3 including liquid dispersion means on the reactor cartridge member for directing and distributing the flow of liquid through said vessel housing member for assuring even distribution of liquid flow and liquid flow rate between spaced apart electrodes of the reactor cartridge member.

7. The treatment apparatus of claim 3 wherein at least two said reactor cartridge members are provided for interchangeable and exchangeable installation into said vessel housing member for treatment of liquids.

8. The treatment apparatus of claim 7 wherein at least one reactor cartridge member mounts electrodes formed of a first selected material and at least one reactor cartridge member mounts electrodes formed of a second selected material.

9. The treatment apparatus of claim 1 wherein at least one reactor cartridge member mounts electrodes having a first selected configuration and at least one reactor cartridge member mounts electrodes having a second selected configuration.

10. A treatment apparatus for the electrolytic treatment of liquids, the treatment apparatus comprising:
 a) a substantially hollow vessel housing member having a first closed end and an opposite, releasably closeable, open second end defining a predetermined, substantially uniform liquid containing vessel interior space therebetween,
 b) at least one electrode-mounting reactor cartridge member configured for installation into and removal from said substantially hollow vessel interior space as a single unit through said releasably closeable, open second end, each said at least one reactor cartridge member comprising:
  (1) a cartridge base support member configured to releasably engage said vessel housing for supporting the cartridge member within the substantially hollow interior of the vessel housing,
  (2) a plurality of electrodes formed of a selected material and having a selected, relatively corresponding configuration, and
  (3) electrode-securing support means on said base support member for securing and supporting said plurality of electrodes in operative, spaced apart condition entirely separately from and independently of any electrical connection of any of said plurality of electrodes to a source of electrical power,
  (4) whereby each said at least one reactor cartridge member may selectively and alternately be installed into and removed from said vessel housing member as a single, self-contained unit,
 c) liquid inlet means and liquid outlet means on said vessel housing member for introducing a flow of liquid into said vessel housing member and through the interior of the vessel between the spaced apart plurality of electrodes of a reactor cartridge installed in the vessel and then out of the vessel housing in a continuous regulated flow, and
 d) said vessel housing member fixedly mounting spaced apart first and second non sacrificial electrodes each connected to a source of power and said removable reactor cartridge member mounts a plurality of non electrified, sacrificial electrodes configured, when said reactor cartridge is installed in said vessel housing member, to conductively intercept the space between said first and second non sacrificial electrodes.

11. A treatment apparatus for the electrolytic treatment of liquids, the treatment apparatus comprising:
 a) a substantially hollow vessel housing member having a first closed end and an opposite, releasably closeable, open second end defining a predetermined, substantially uniform liquid containing vessel interior space therebetween,
 b) at least two separate, interchangeable electrode-mounting reactor cartridge members each configured for installation into and removal from said substantially hollow vessel interior space as a single unit through said releasably closeable, open second end, each said at least two said reactor cartridge members comprising:
  (1) a cartridge base support member configured to releasably engage said vessel housing for supporting the cartridge member within the substantially hollow interior of the vessel housing,
  (2) a plurality of electrodes formed of a selected material and having a selected, relatively corresponding configuration, and
  (3) electrode-securing support means on said base support member for securing and supporting said plurality of electrodes in operative, spaced apart condition entirely separately from and independently of any electrical connection of any of said plurality of electrodes to a source of electrical power,
  (4) wherein at least one of said at least two reactor cartridge members mounts electrodes formed of a first selected material and at least one of said at least two reactor cartridge members mounts electrodes formed of a second material whereby each of said interchangeable reactor cartridge members may be selectively, interchangeably and exchangeably installed into said vessel housing member for treatment of liquids, and
 c) liquid inlet means and liquid outlet means on said vessel housing member for introducing a flow of liquid into said vessel housing member and through the interior of the vessel between the spaced apart plurality of electrodes of a reactor cartridge installed in the vessel and then out of the vessel housing in a continuous, regulated flow.

12. The treatment apparatus of claim 11 wherein at least one reactor cartridge member mounts electrodes having a first selected configuration and at least one reactor cartridge member mounts electrodes having a second selected configuration.

* * * * *